US008948046B2

(12) United States Patent
Kang et al.

(10) Patent No.: US 8,948,046 B2
(45) Date of Patent: Feb. 3, 2015

(54) ROUTING METHOD AND SYSTEM FOR A WIRELESS NETWORK (75) Inventors: Yong Kang, San Jose, CA (US); Changming Liu, Cupertino, CA (US)

(73) Assignee: Aerohive Networks, Inc., Sunnyvale, CA (US)

( * ) Notice: Subject to any disclaimer, the term of this patent is extended or adjusted under 35 U.S.C. 154(b) by 839 days.

(21) Appl. No.: 11/903,443

(22) Filed: Sep. 21, 2007

(65) Prior Publication Data

US 2008/0267116 A1    Oct. 30, 2008

Related U.S. Application Data (60) Provisional application No. 60/926,590, filed on Apr. 27, 2007.

(51) Int. Cl.
*H04L 12/28* (2006.01)
*H04W 40/24* (2009.01)
(Continued)

(52) U.S. Cl.
CPC ............ *H04W 40/24* (2013.01); *H04L 45/02* (2013.01); *H04L 45/18* (2013.01); *H04W 40/02* (2013.01); *H04L 45/00* (2013.01); *H04W 40/36* (2013.01); *H04L 45/22* (2013.01); *H04W 84/005* (2013.01); *H04L 45/20* (2013.01); *H04W 40/30* (2013.01); *H04W 4/06* (2013.01)
USPC ............ 370/254; 370/248; 370/249; 370/328

(58) Field of Classification Search
CPC ......... H04L 45/00; H04L 45/18; H04L 45/02; H04L 45/22; H04W 4/06; H04W 40/02; H04W 84/0005
See application file for complete search history.

(56) References Cited

U.S. PATENT DOCUMENTS 5,471,671 A    11/1995 Wang et al.
5,697,059 A    12/1997 Carney
(Continued)

OTHER PUBLICATIONS

Clausen, T., et al, Optimized Link State Routing Protocol (OLSR), Network Working Group, Oct. 2003, pp. 1-71.
(Continued)

*Primary Examiner* — Andrew Chriss
*Assistant Examiner* — Salvador E Rivas
(74) *Attorney, Agent, or Firm* — Sheppard, Mullin, Richter & Hampton LLP (57) ABSTRACT A method and system for selecting a route in a wireless network for the transmission of a data packet between wireless nodes in said network using a modified link-state routing algorithm wherein only a limited number of broadcast messages are generated to synchronize the link-state database throughout the wireless network. A subset of nodes called portal nodes within the network are elected to do the broadcasting for the entire network. Each portal node broadcasts an announcement of its identity to all of the wireless nodes. Each wireless node responds to these broadcasts to select one of the portal nodes as its root portal node. It then identifies a unicast route back to its root portal node, and sends a link-state register message to this portal node. These link-state register messages received by each portal node are aggregated by them and are broadcast to each of the wireless nodes for storage. When a data packet is thereafter received by a wireless node from a neighboring node, it detects if the data packet satisfies one of a plurality of predetermined conditions and rebroadcasts the data packet to neighboring wireless nodes if none of the conditions is satisfied.

8 Claims, 6 Drawing Sheets (51) Int. Cl.
*H04L 12/705* (2013.01)
*H04L 12/701* (2013.01)
*H04L 12/733* (2013.01)
*H04W 4/06* (2009.01)
*H04L 12/751* (2013.01)
*H04W 40/02* (2009.01)
*H04W 40/36* (2009.01)
*H04L 12/707* (2013.01)
*H04W 84/00* (2009.01)
*H04W 40/30* (2009.01)

(56) References Cited

U.S. PATENT DOCUMENTS

| | | |
|---|---|---|
| 5,726,984 A | 3/1998 | Kubler et al. |
| 5,956,643 A | 9/1999 | Benveniste |
| 6,112,092 A | 8/2000 | Benveniste |
| 6,154,655 A | 11/2000 | Borst et al. |
| 6,201,792 B1 | 3/2001 | Lahat |
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1 | 2/2003 | Andersson et al. |
| 6,628,938 B1 | 9/2003 | Rachabathuni et al. |
| 6,775,549 B2 | 8/2004 | Benveniste |
| 6,865,393 B1 | 3/2005 | Baum et al. |
| 7,057,566 B2 | 6/2006 | Theobold |
| 7,085,224 B1 | 8/2006 | Oran |
| 7,085,241 B1 | 8/2006 | O'Neill et al. |
| 7,164,667 B2 | 1/2007 | Rayment et al. |
| 7,174,170 B2 | 2/2007 | Steer et al. |
| 7,177,646 B2 | 2/2007 | Corson et al. |
| 7,181,530 B1 | 2/2007 | Halasz et al. |
| 7,224,697 B2 | 5/2007 | Banerjea et al. |
| 7,251,238 B2 | 7/2007 | Joshi et al. |
| 7,512,379 B2 | 3/2009 | Nguyen |
| 7,706,789 B2 | 4/2010 | Qi et al. |
| 7,716,370 B1 | 5/2010 | Devarapalli |
| 7,768,952 B2 | 8/2010 | Lee |
| 7,793,104 B2 | 9/2010 | Zheng et al. |
| 7,843,907 B1* | 11/2010 | Abou-Emara et al. ........ 370/386 |
| 7,844,057 B2 | 11/2010 | Meier et al. |
| 7,921,185 B2 | 4/2011 | Chawla et al. |
| 7,949,342 B2 | 5/2011 | Cuffaro et al. |
| 8,219,688 B2 | 7/2012 | Wang |
| 8,249,606 B1 | 8/2012 | Neophytou et al. |
| 8,493,918 B2 | 7/2013 | Karaoguz et al. |
| 2001/0006508 A1 | 7/2001 | Pankaj et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0128984 A1 | 9/2002 | Mehta et al. |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1* | 9/2003 | Ogier et al. ................. 370/351 |
| 2004/0013118 A1 | 1/2004 | Borella |
| 2004/0022222 A1 | 2/2004 | Clisham |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1* | 6/2004 | Van Ackere et al. .......... 370/419 |
| 2004/0162037 A1 | 8/2004 | Shpak |
| 2004/0192312 A1 | 9/2004 | Li et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0262266 A1 | 11/2005 | Wiberg et al. |
| 2005/0266848 A1 | 12/2005 | Kim |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1 | 6/2006 | Christiansen et al. |
| 2006/0140123 A1* | 6/2006 | Conner et al. ................. 370/238 |
| 2006/0146748 A1* | 7/2006 | Ng et al. ....................... 370/331 |
| 2006/0146846 A1* | 7/2006 | Yarvis et al. .................. 370/406 |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0268802 A1 | 11/2006 | Faccin |
| 2006/0294246 A1 | 12/2006 | Stieglitz et al. |
| 2007/0010231 A1 | 1/2007 | Du |
| 2007/0025274 A1* | 2/2007 | Rahman et al. ............... 370/254 |
| 2007/0025298 A1 | 2/2007 | Jung |
| 2007/0078663 A1 | 4/2007 | Grace |
| 2007/0082656 A1 | 4/2007 | Stieglitz et al. |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0156804 A1 | 7/2007 | Mo |
| 2007/0249324 A1 | 10/2007 | Jou et al. |
| 2007/0263532 A1* | 11/2007 | Mirtorabi et al. ............. 370/228 |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0107027 A1* | 5/2008 | Allan et al. .................... 370/235 |
| 2008/0130495 A1 | 6/2008 | Dos Remedios et al. |
| 2008/0146240 A1 | 6/2008 | Trudeau |
| 2008/0170527 A1 | 7/2008 | Lundsgaard et al. |
| 2008/0207215 A1 | 8/2008 | Chu et al. |
| 2008/0225857 A1 | 9/2008 | Lange |
| 2008/0229095 A1 | 9/2008 | Kalimuthu et al. |
| 2008/0273520 A1 | 11/2008 | Kim et al. |
| 2009/0028052 A1 | 1/2009 | Strater et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0310557 A1 | 12/2009 | Shinozaki |
| 2010/0057930 A1 | 3/2010 | DeHaan |
| 2010/0112540 A1 | 5/2010 | Gross et al. |
| 2010/0115576 A1 | 5/2010 | Hale et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0304738 A1 | 12/2010 | Lim et al. |
| 2010/0311420 A1 | 12/2010 | Reza et al. |
| 2010/0322217 A1 | 12/2010 | Jin et al. |
| 2011/0004913 A1 | 1/2011 | Nagarajan et al. |
| 2011/0040867 A1 | 2/2011 | Kalbag |
| 2011/0055326 A1 | 3/2011 | Michaelis et al. |
| 2011/0064065 A1 | 3/2011 | Nakajima et al. |
| 2011/0182225 A1 | 7/2011 | Song et al. |
| 2011/0185231 A1 | 7/2011 | Balestrieri et al. |
| 2012/0014386 A1 | 1/2012 | Xiong et al. |

(56) References Cited

U.S. PATENT DOCUMENTS

2012/0290650 A1    11/2012    Montuno et al.
2013/0028158 A1    1/2013    Lee et al.
2014/0269327 A1    9/2014    Fulknier et al.

OTHER PUBLICATIONS

Perkins, C., et al, Ad hoc On-Demand Distance Vector (AODV) Routing, Network Working Group, Oct. 2003, pp. 1-35.

International Application No. PCT/US2011/047591, International Search Report and Written Opinion mailed Dec. 19, 2011.

International Application No. PCT/US2008/061674, International Search Report and Written Opinion mailed Oct. 14, 2008.

International Application No. PCT/US2012/059093, International Search Report and Written Opinion mailed Jan. 4, 2013.

He, Changhua et al., "Analysis of the 802.11i 4-Way Handshake," Proceedings of the 3rd ACM Workshop on Wireless Security, pp. 43-50, Oct. 2004.

Lee, Jae Woo et al, "z2z: Discovering Zeroconf Services Beyond Local Link," 2007 IEEE Globecom Workshops, pp. 1-7, Nov. 26, 2007.

\* cited by examiner

ROUTING METHOD AND SYSTEM FOR A WIRELESS NETWORK

This application claims the benefit of U.S. Provisional Patent Application Ser. No. 60/926,590, filed Apr. 27, 2007, pursuant to 35 U.S.C. §119(e).

BACKGROUND OF THE INVENTION

The present invention relates to methods and systems for enabling data packets to be routed through a wireless network, where the network comprises a number of individual wireless transceivers configured to enable data packets to move or hop from one wireless transceiver or node to another until they reach a given destination. More particularly, the present invention includes a routing protocol that uses a modified link-state routing algorithm to make fast routing computations and reverse-path-lookup rules to prevent broadcast loops.

A trend in distributed networks is the proliferation of wireless applications for voice, fax, paging, data, images, and video. The use of these wireless applications is expanding to true global coverage through the use of satellite networks and in-flight data communications services on commercial airlines. These wireless networks generally have lower bandwidths and higher error rates than traditional wired networks. One type of wireless network in particular, the "ad-hoc," or Mobile Ad-Hoc Network (MANET) is particularly sensitive to these issues. MANETs are networks that may be deployed rapidly with little or no assistance and that do not have a central network structure, such as cellular-base stations or overhead satellite assets. The nodes within the MANETs are typically highly mobile and use a variety of wireless network platforms. Furthermore, nodes within the MANET may dynamically enter or leave the network. Therefore, the number of nodes and the disposition of nodes within the MANET are highly fluid and are often continually changing. By their nature, MANETs complicate the design and implementation of acceptable protocols to support communications between nodes within the network.

The configuration of an ad-hoc network typically is either hierarchical or flat. In a hierarchical ad-hoc network, the network nodes are partitioned into groups called clusters. Within each cluster, one node is chosen to be a "cluster head." In contrast, the nodes in a flat ad-hoc network are all equal. Connections are established between nodes that are in close enough proximity to one another to allow sufficient radio propagation conditions to establish connectivity. Routing between nodes is constrained by the connectivity conditions, and possibly by security limitations. In the general case, a network may use a hybrid approach wherein a cluster-based topology is used for routing-control traffic but a flat network topology is used for the actual user-data traffic.

Ad hoc networking introduces several important difficulties for traditional routing protocols. First, determining a packet route requires that the source node know the reachability information of its neighbors. Second, the network topology may change quite often in an ad-hoc network. As the number of network nodes increases, the potential number of destinations becomes large, requiring large and frequent exchanges of data (e.g., routes, route updates, or routing tables) among the network nodes. Updates in the wireless communication environment travel over the air, and therefore consume a great deal of network resources. As the network size increases and as the nodal mobility increases, smaller and smaller fractions of this total amount of control traffic are of practical usefulness. This is due to the fact that, as the nodes become more mobile, the lifetime of a link decreases, and the period in which the routing information remains valid decreases as well. It is easy to see that, for any given network capacity, there exists a network size and nodal mobility which would result in having all the network capacity wasted on control traffic.

Existing IP routing protocols that manage wireless networks can be classified either as proactive or as reactive. Proactive protocols attempt to continuously evaluate the routes within the network, so that when a packet needs to be forwarded, the route is already known and can be used immediately. The Optimized Link State Routing Protocol (OLSR) is one example of such a proactive scheme known to persons of ordinary skill in the art. Reactive protocols, on the other hand, invoke a route determination procedure on demand only. Thus, when a route is needed, a global search procedure is employed. The classical flood-search algorithms are typical reactive protocols, such as the Ad Hoc On-Demand Distance Vector Protocol (AODV), which is also known to persons of ordinary skill in the art.

The advantage of proactive protocols is that the route is always pre-calculated, so that there is little delay involved when forwarding data traffic. In reactive protocols, the delay created by the process of determining a route can be quite significant. Furthermore, the global search procedure of reactive protocols requires significant control traffic. An example of how this search procedure is implemented is described in the AODV Protocol. Such route determination delays may also cause data packets to be dropped, unless the device has sufficient capacity to buffer them. Such buffer systems also cause significant implementation complexity. Consequently, pure reactive routing protocols may not be practical for real-time communications in MANETs. However, pure proactive schemes are also not appropriate for MANETs, as they continuously use a large portion of the network's capacity to keep the routing information current, even with the optimization procedure used in OLSR. OLSR uses a procedure called MultiPoint-Relay (MRP) to reduce the flooding control traffic to a certain degree, but it still does not change the fundamental per-node-flooding mechanism.

At the IETF (Internet Engineering Task Force), there is a MANET working group (see http://www.ietf.org/html.charters/manet-charter.html) which is working on a standardizing IP routing protocol functionality suitable for wireless routing applications within both static and dynamic topologies with increased dynamics due to node motion or other factors. The routing protocols that have been standardized by this working group include AODV (RFC 3561), OLSR (RFC 3626), TBRPF (RFC 3684) and DSR (RFC 4728). More detailed information can be found at the website given above.

The IEEE 802.11s working group is proposing two routing approaches: one based on AODV and another one based on an OLSR. These approaches attempt to port the same routing protocol standardized by IETF to a Layer 2 domain. That is, while the basic routing protocol is still the same, the IP addresses have been replaced with Medium Access Control (MAC) addresses, while the IP based routing messages have been replaced with 802.11 Information Elements in 802.11 frames. The AODV approach is used with the hope that it will consume less network resources as long as the topology correctness satisfies the minimum requirement. This approach has the limitation of slow network topology convergence and longer route setup delays, which are very critical to the users of a wireless access network. One of the primary goals when deploying a wireless access network is to support mobility, which means supporting a virtually constantly changing network topology. Slow topology convergence time also indicates a bad network application response time, which is unacceptable for some timing critical applications like Voice Over IP (VOIP). The Ad Hoc On-Demand Distance Vector Routing Protocol, dated July, 2003, and the Optimized Link State Routing Protocol, dated October 2003, are incorporated herein in their entirety by reference.

Some prior art network equipment vendors use an approach called the controller-based Wi-Fi access solution, which depends on a wired architecture to connect all access points back to a central controller. Because of this wired and centralized backhaul network topology, the networking routing challenge disappears, but it does not come for free. The price paid by this sort of network is the limited scalability and system robustness that it provides, which is intrinsic for any centralized approach.

What is needed is a routing protocol that is optimized for static backhaul topologies with mobile stations and based on Layer 2 information similar to the IEEE 802.11s path selection protocol.

What is further needed is a scalable routing method and system that significantly reduces the broadcast control message overhead in a distributed wireless network, while still maintaining fast routing computations that are loop free, to thereby provide a scalable robust wireless access network. After the network route is established, what is also needed is a method and system for eliminating data packet broadcast looping.

SUMMARY OF THE INVENTION

The present invention is a proactive best-path routing protocol for use in scalable and robust wireless distributed systems with wired or wireless or both as backhaul connections. The routing protocol according to the present invention uses a modified proactive link-state routing algorithm, wherein only a limited number of broadcast messages are generated to synchronize the link-state database throughout the wireless network. This is quite different from the OLSR approach. More specifically, the present invention elects a subset of nodes called portal nodes within the network to do broadcasting for the whole network. Each portal node broadcasts an announcement of its identity to all of the wireless nodes. Each wireless node responds to these broadcasts to select one of the portal nodes as its root portal node. It then identifies a unicast route back to its root portal node, and sends a link-state register message to this portal node. These link-state register messages received by each portal node are aggregated by them and are broadcast to each of the wireless nodes for storage.

The present invention uses reverse-path-lookup rules to do broadcast loop prevention when forwarding broadcast and multicast traffic, to thereby provide an efficient way to handle wireless client mobility. When a data packet is received by a wireless node from a neighboring node, it detects if the data packet satisfies one of a plurality of predetermined conditions and rebroadcasts the data packet to neighboring wireless nodes if none of the conditions is satisfied. By contrast, both OLSR and AODV cache the per packet sequence number to eliminate the broadcast forwarding loop. This per packet state created in a device's data path introduces a significant complexity, thereby making data forwarding too complicated.

Broadly stated, the present invention is a method for selecting a route in a wireless network for the transmission of a data packet between a wireless node and a selected one of a plurality of portal nodes that each function as a backhaul connection to a wired or wireless data network, where each of the data packets includes four addresses: a transmitting node address, a receiving address within one wireless node hop, the original sending node address, and the ultimate destination address. The method includes causing each portal node to broadcast an announcement of its identity as a portal node to all of the wireless nodes, each wireless node acting in response to this broadcast to elect one of said portal nodes as its root portal node and to identify a unicast path back to its elected portal node, causing each wireless node to send a link-state register message to its elected root portal node, each portal node acting in response to the receipt of a link-state register message to aggregate these messages into one link-state-update packet and to broadcast said link-state-update packet to each of the wireless nodes, each wireless node storing said received link-state-update packets in a link-state database at said node.

The present invention further comprises a method and system for detecting in a given wireless node if a data packet being broadcast from a neighboring node satisfies one of a plurality of conditions indicating that the data packet should not be rebroadcast and re-broadcasting the data packet to neighboring wireless nodes if none of the plurality of conditions is satisfied.

The present invention provides the following advantages:

Distributed Cooperative Control

The distributed routing and packet forwarding approach according to the present invention makes the wireless network extensible and scalable. For example, more than one portal can be, and typically is active at any given time receiving and broadcasting link-state information. The present invention also eliminates the "single-point-of-failure" that exists with a central controller based wireless network, to therefore make the network robust.

Proactive Routing Protocol

Network topology information is exchanged proactively, so that it's faster after client stations join the network or roam from one wireless node to another.

Minimized Control Message Broadcast

Each node in the network elects a portal node as its root portal node. With the broadcast messages only coming from portal nodes, the consumption of valuable airtime bandwidth by control messages is significantly reduced. It is this reduction in overhead that makes the network usable for forwarding client data traffic. Excessive control message overhead has been a major barrier to the deploying of proactive routing protocols in prior art wireless networks.

Effective Multicast/Broadcast Loop Detection Mechanism

The presented loop detection mechanism is simple and effective, compared to any other cache based mechanisms (e.g., where the data packet or cache sequence number is modified after forwarding a packet). It avoids having to build any per packet state at each forwarding node, therefore making it practical to engineer the distributed proactive routing protocol in a wireless network.

2 Level Link-State Organization to Minimize Topology Change Impact on Routing when Wireless Client Mobility Happens The separating of backhaul link-state and client link-state in the wireless access network enables the topology changes caused by client mobility to have a minimal impact on routing algorithm complexity, which thereby boosts the scalability of the routing protocol.

Fast Roaming Support

The fast roaming mechanism enabled by the process according to the present invention reduces the possibility of data flow interruptions caused by topology changes and routing convergence times.

Seamless Interoperation with Existing Ethernet Switching Technologies

The present invention works with both wired and wireless backhaul links. It is designed to interoperate with existing Ethernet LAN switching technology. The user does not need to change any existing wired network topology to deploy a wireless access network according to the present invention, and a user always has the ability to easily extend or reduce the wireless deployment in the future.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION OF THE PREFERRED EMBODIMENT

The present invention provides a method and system for synchronizing network link-state information, determining routing for each participating device, forwarding of data packets accordingly, and internetworking with existing Layer 2 switching networks.

According to the present invention, to synchronize link-state information for a particular node in a wireless network having a plurality of nodes, the node link-state must be broadcast to the whole network. Only a small subset of nodes are enabled to broadcast to the whole network. If a node belongs to this subset, the node is called a "portal" node. Preferably each portal node also is a backhaul link to an external wired LAN, e.g., an Ethernet link to the an Internet Service Provider (ISP). All other wireless nodes will have to unicast their link-state to one of the portal nodes, and then that portal node will aggregate and broadcast the nodes' link-states to the whole network. Eventually, each node within the network will have a synchronized link-state database of every node in the network, and can then run a standard shortest path selection algorithm to determine the route to each destination. With a unicast routing table now residing in each wireless node, a further embodiment of the present invention comprises a "reverse-path-lookup" method and system which is used by each node to break broadcast/multicast data packet loops. The protocol method according to the present invention includes the following parts:

Portal node election.
Link-state register/broadcasting.
Route determination.
Packet forwarding.

Figure 1:
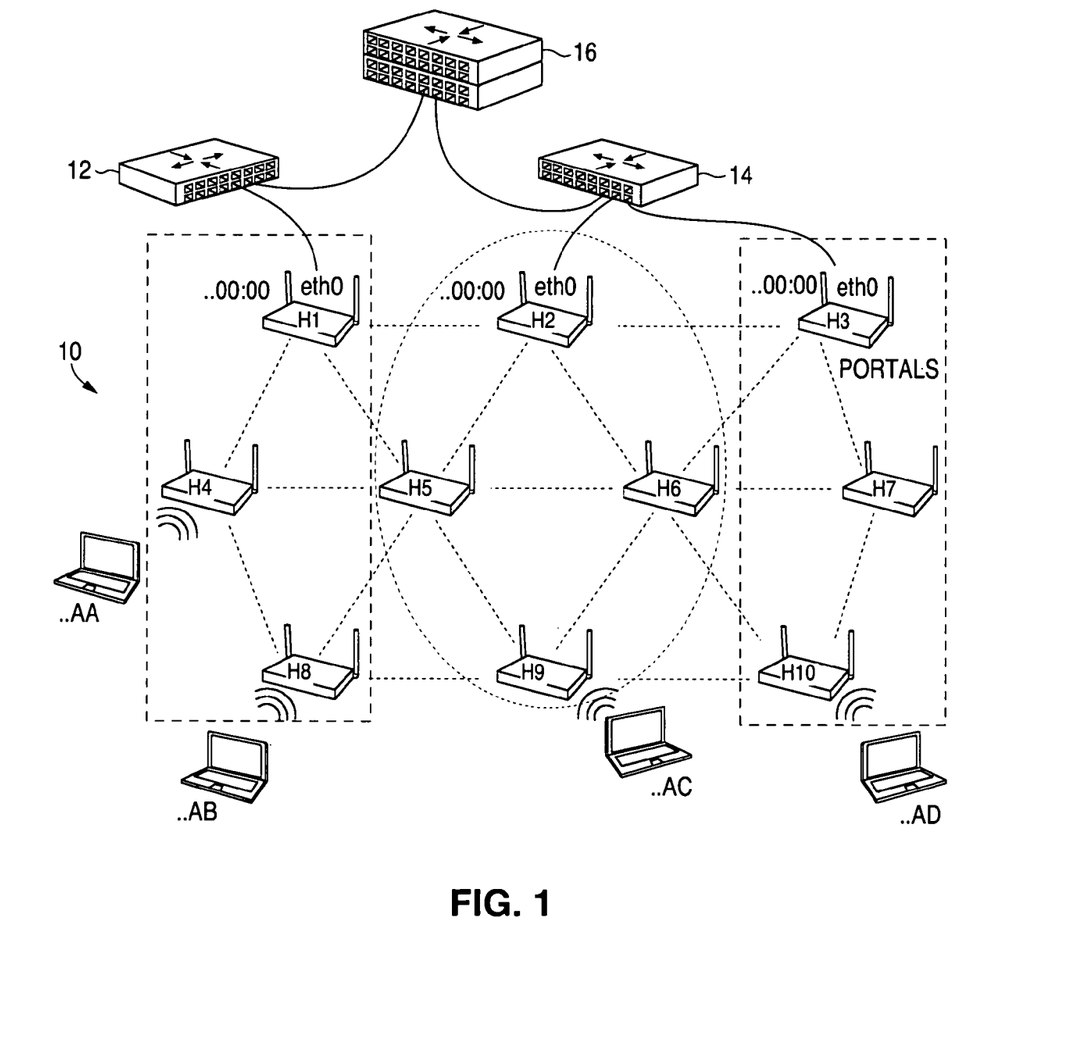
FIG. 1 illustrates a wireless ad-hoc network connected to access switches and a distribution switch of an Internet Service Provider (ISP) by means of a plurality of portal nodes or access points.

FIG. 1 illustrates an exemplary wireless ad-hoc network 10 externally connected to access switches 12 and 14 and a distribution switch 16 of an Internet Service Provider (ISP) by means of a plurality of portal nodes. As shown in FIG. 1, certain of the wireless nodes in network 10 have wired connections to an external network, such as a local area network (LAN), to provide access points (APs) to and from such an external network in a conventional manner, e.g., by means of an Ethernet link to the access switches 12, 14 and distribution switch 16. Each of these wireless nodes in a preferred embodiment of the present invention is elected to be a portal node. In the exemplary network shown in FIG. 1, these portal nodes include nodes H1, H2, and H3. Each portal node functions to broadcast announcements to the whole wireless network. The non-portal wireless nodes in the wireless network 10 in FIG. 1 include nodes H4-H10. A plurality of wireless clients or client stations AA, AB, AC and AD are also shown, each linked to a different access point (AP) in the wireless network. Preferably, each of the wireless nodes in network 10 is enabled to be a client station access point. In the exemplary wireless network in FIG. 1, client AB is linked to wireless node H8, client AC is linked to wireless node H9 and client AD is linked to wireless node H10. Each wireless client can comprise a laptop computer, PDA, cell phone, or any other wireless device seeking network access. Note also that each wireless node H4-H10 preferably is able to serve multiple client stations at the same time. The present invention utilizes the protocol method according to the present invention to rapidly respond to client station topology changes.

The portal announcements generated by each portal node serve two purposes. The first is to let every other node know of each portal node's existence. The second is to cause each non-portal node to elect one portal node to be its root portal node, to establish a unicast path back to its elected root portal node, and then to unicast the node's link-state to its root portal node.

The announcement packet generated by each portal node contains the following information:

| Node ID | Sequence number | Metric |
| --- | --- | --- |

Where:
The NodeID is the address of a portal node (e.g., its Ethernet address);
The Sequence number is an increasing integer per node; and
The Metrics value is the cost of each network link.

In a preferred embodiment, the metric value represents the number of links that the announcement has traversed from said portal node to the node receiving the announcement. Each non-portal wireless node elects as its root portal node the portal node whose announcement metric value is the lowest.

Figure 2:
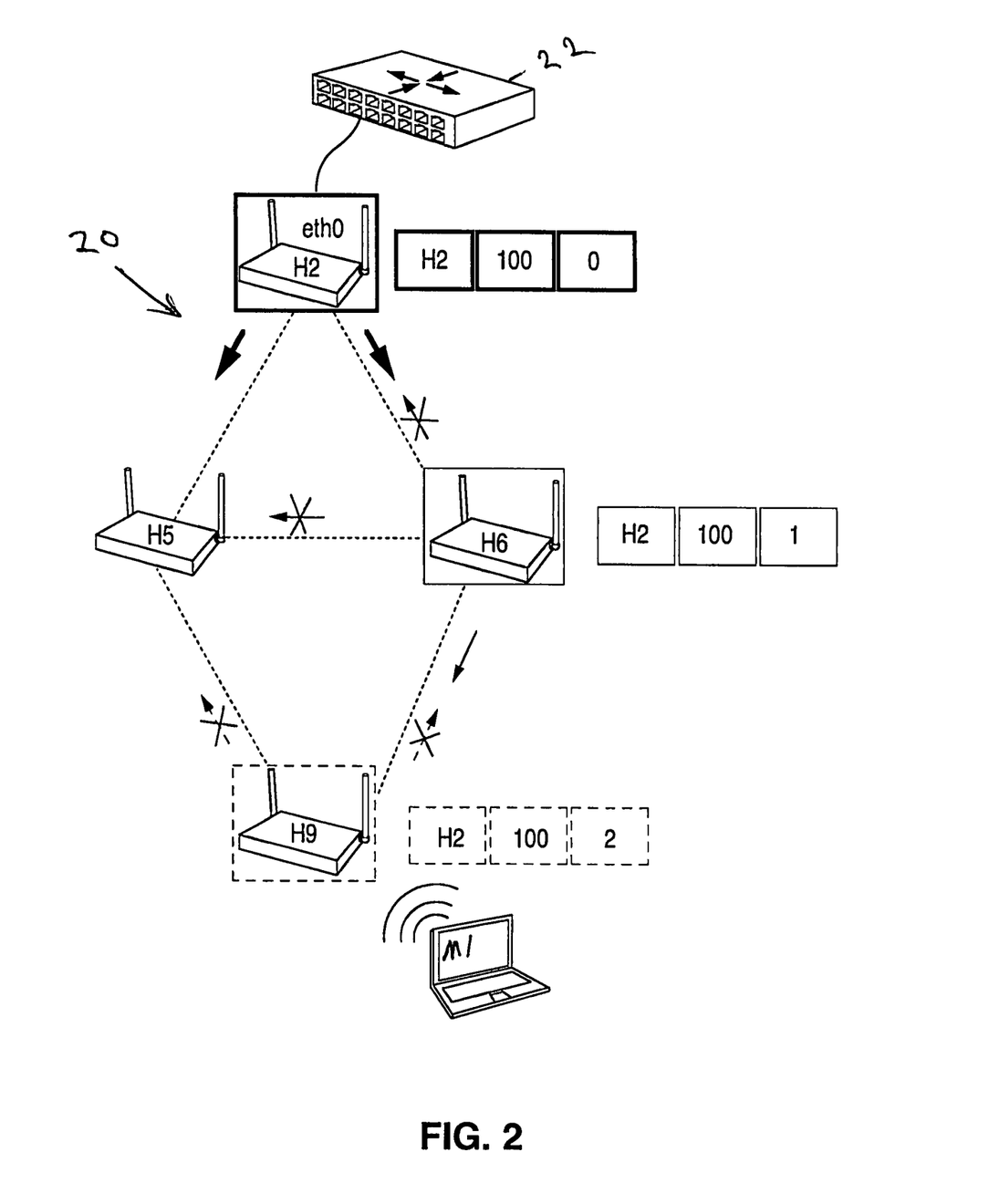
FIG. 2 illustrates an exemplary portal node election procedure in a wireless ad-hoc network according to the present invention.

FIG. 2 illustrates an exemplary portal node election procedure according to the present invention in a wireless ad-hoc network 20 shown in FIG. 2. In this example, H2 is a portal node that has an external connection to an access switch 22, and enables the wireless network 20 to access the Internet or some other data network. In addition, a client station M1 is shown linked to wireless node H9.

Step-1: Portal node H2 initiates an announcement 100, comprising a node ID of H2, a sequence number of 100, and a metric value of 0. This broadcast is schematically illustrated as the two bold arrows pointing from portal node H2.

Step-2: Both H5 and H6 receive the broadcast packet (the following discussion focuses on H6 as an example of typical node operation; H5 will operate in the same fashion). H6 always records the latest sequence number per node; in this case, H6 knows H2's most recent sequence number had been 99 before announcement 100 was generated. H6 compares the stored sequence number 99 with the one carried within the packet 100; the packet is newer than what H6 had seen before, and so it takes this packet. By taking this packet, H6 will (1) update H2's sequence number to 100, (2) install a unicast route <to H2, next hop is H2 cost is 1>, and (3) H6 will relay the broadcast to other wireless nodes in its neighborhood. Thus, the relayed announcement is: node ID is H2, sequence number is 100, metric is 1. This broadcast is schematically shown in FIG. 2 as three non-bolded arrows pointing from node H6.

Step-3: H2, H5, and H9 all receive the relayed announcement and follow the same logic as in step-2, but only H9 will take the packet. H2 and H5 will both drop the packet because the sequence number carried within the packet is not newer than what they saw before. This is shown in FIG. 2 schematically where two of the non-bolded arrows have an X drawn across them.

Step-4: H9 will take the packet and install a unicast route <to H2, next hop is H6 cost is 2>. Also, H9 will relay the broadcast packet again, as schematically illustrated in FIG. 2 as dotted arrows pointing from H9, but this broadcast packet will be dropped by H5 and H6 for the same reason as in Step-3.

To abstract the steps of this portal node election process according to the present invention from the above example, when a node receives an announcement, the following actions are preferably done at each node:

1. Identify who originated the announcement, by reading the node ID from the announcement.
2. Decide if the packet should be taken, by comparing the stored node's sequence number and the one carried in the announcement.
3. Once the announcement is taken, update the stored sequence number, and install a unicast route to the announcing portal node.
4. Relay the announcement after updating the Metric value.

If multiple portal nodes exist, the same logic will apply to the announcement from each portal node. As can be seen, each portal node operates independently of the other portal nodes and so the wireless network is not limited to having only one portal node operating at a time.

Link-State Register/Broadcasting:

After each node has identified a route back to each portal node, it will register local link-state information to one or more selected portal nodes. The portal nodes will aggregate and broadcast the nodes' link-states to the whole network.

The Link-state-register is a unicast message and contains the following information:

| Node ID | Backhaul links | Client links |
| --- | --- | --- |

The link-state-broadcast is a broadcast message that contains a common header and the aggregated link-states registered by other nodes:

| Node ID | Sequence number |
| --- | --- |
| Node-1 link-state | |
| ...... | |
| Node-n link-state | |

Figure 3:
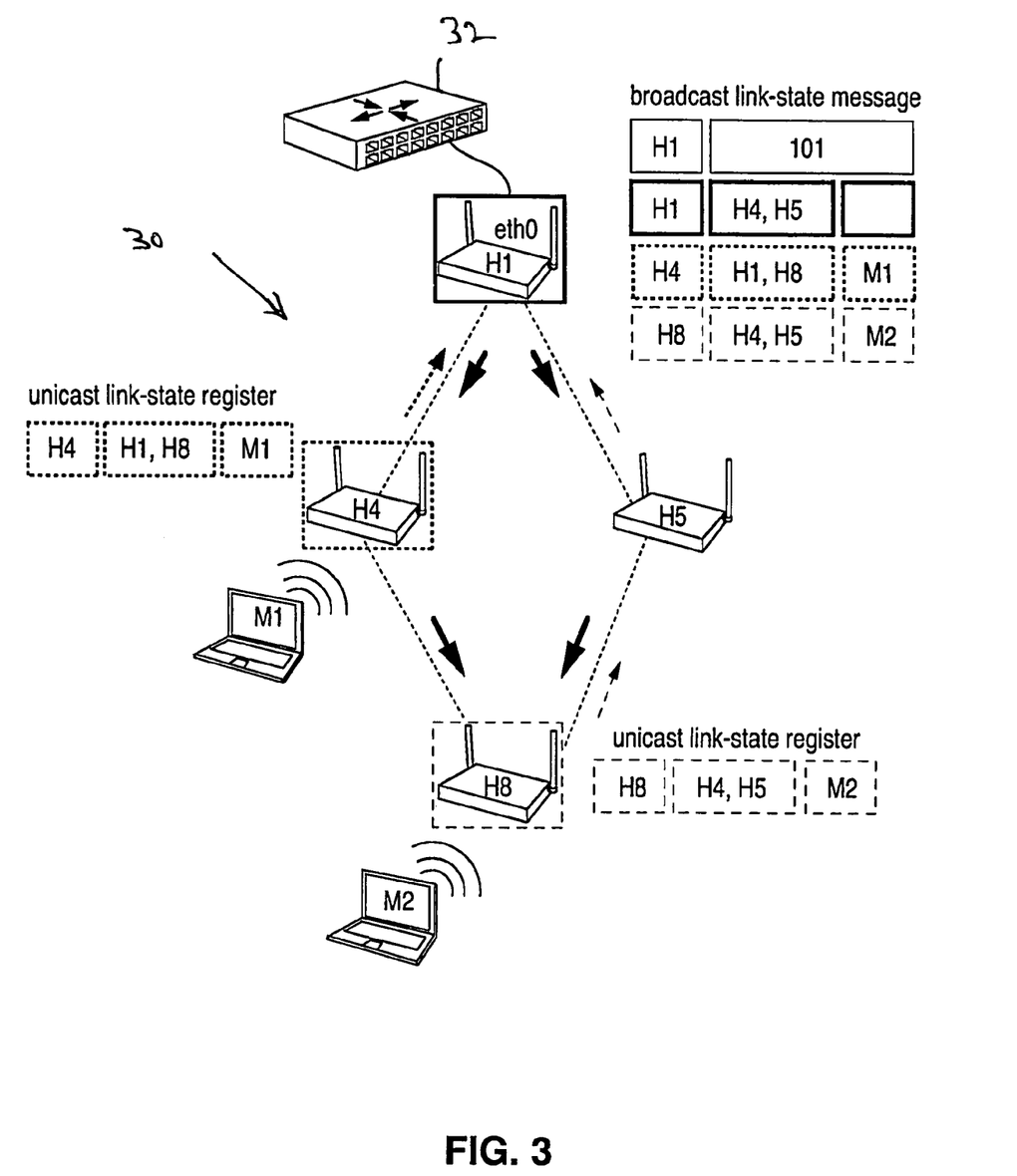
FIG. 3 illustrates an exemplary link-state register and broadcast procedure in a wireless ad-hoc network according to the present invention.

FIG. 3 illustrates an exemplary link-state register and broadcast procedure according to the present invention in a wireless ad-hoc network 30. In this example, the portal node H1 is connected to an external access switch 32 to enable the wireless network 30 to access the Internet or some other data network. In addition, client status M1 and M2 are linked to wireless nodes H4 and H8, respectively. As seen in FIG. 3, the exemplary process is as follows:

Step-1: After H8 receives the portal announcement, it will register its link-state information to the portal node by sending a unicast message to portal node H1 (as illustrated by the thin dashed arrow pointing from H8 in FIG. 3). Because H5 already set up the route back to the portal node, it is able to forward the message to the portal node H1 (as illustrated by the thin dashed arrow pointing from H5). H4 will do the same thing (as illustrated by the thick dashed arrow pointing from H4).

Step-2: Portal node H1 will receive a link-state register message from each node, aggregate multiple link-state messages into one packet and broadcast this aggregated packet to the whole network. We call this the aggregated message the link-state-update message (as illustrated by the bold arrows pointing from H1, H4 and H5). The link-state-update message will share the same increasing sequence number, so it can prevent broadcasting loops and ensure that the receiving node will be the only one to take the latest message.

Step-3: Every node in the network will receive the link-state-update message, so that each node will then have a synchronized link-state database.

Route Calculation:

By doing portal announcing and link-state register/broadcasting, each node in the network will have the same synchronized database. The present invention uses a novel technique to organize the link-state data structure in such a way that the frequent wireless client (e.g., laptop) mobility will not cause the route selection algorithm to constantly run, which will save a significant amount of system resources (e.g., CPU time and memory usage).

As illustrated in the above example, each wireless node divides the link-states into two categories:

backhaul link: a logical link between two wireless nodes, either through a wireless radio or a wired link (e.g., an Ethernet link).

Such a link can be a wireless link or a wired link, unlike 802.11s, where the link must always be a wireless link.

client link: A link between a client mobile device or station and a wireless node AP.

To calculate a route to a client station, for example, a single table lookup can identify which node the station is attached to, and then any standard link-state algorithm can be used to get the route to the attaching node. We call this a 2-level route calculation.

An exemplary route calculation using a link-state routing protocol known in the art is as follows. As background, the link-state routing protocol is one of the two well-known main classes of routing protocols used in packet-switched networks for computer communications. Examples of link-state routing protocols include Open Shortest Path First (OSPF) and Intermediate System to Intermediate System (IS-IS). The link-state protocol is performed by every wireless node in the network (i.e. nodes which are prepared to forward packets, also called routers). The basic concept of link-state routing is that every node receives a map of the connectivity of the network, in the form of a table showing which nodes are connected to which other nodes. Each node then independently calculates the best next hop from it for every possible destination in the network. It does this using only its local copy of the map, and without communicating in any other way with any other node. The collection of best next hops forms the routing table for the node.

With the complete set of link-states (one from each node in the network) in hand, it is straightforward for each wireless node to produce this table for the map of the network. The algorithm simply iterates over the collection of link-states, and for each one, it makes links on the map of the network, from the node which sent that message, to all the nodes which that message indicates are neighbors of the sending node. No link is considered to have been correctly reported unless the two ends agree, (i.e., if one node reports that it is connected to another, but the other node does not report that it is connected to the first, there is a problem, and the link is not included on the map).

The second step in the link-state algorithm is for each node to produce routing tables from the map it has generated. Each node independently runs an algorithm over the map to determine the shortest path from itself to every other node in the network. Generally, some variant of Dijkstra's algorithm is used. Basically, each node maintains two data structures: a tree containing nodes which are "done", and a list of candidates. The algorithm starts with both structures empty; it then adds to the first one the node itself. The algorithm then repetitively:

Adds to the second (candidate) list all nodes which are connected to the node just added to the tree (excepting of course any nodes which are already in either the tree or the candidate list).

Of the nodes in the candidate list, the one which is closest to any of the nodes already in the tree is moved to the tree (attaching it to the appropriate neighbor node already there).

Repeats as long as there are any nodes left in the candidate list. (When there are none, all the nodes in the network will have been added to the tree.)

This procedure ends with the tree containing all the nodes in the network, with the node on which the algorithm is running as the root of the tree. The shortest path from that node to any other node is indicated by the list of nodes one traverses to get from the root of the tree, to the desired node in the tree. With the shortest paths in hand, filling in the routing table is again straightforward. For any given destination node, the best next hop for that destination is the node which is the first step from the root node, down the branch in the shortest-path tree which leads toward the desired destination node. To create the routing table, it is only necessary to walk the tree, remembering the identity of the node at the head of each branch, and fill in the routing table entry for each node one comes across with that identity.

As mentioned above, a key disadvantage of prior art link-state protocols is that each wireless node is able to broadcast link-state messages to other nodes throughout the network (i.e., it is flooded throughout the network whenever there is a change in the connectivity between the node and its neighbors, e.g., when a link fails or a client station moves from one node to another). Then, each node must recreate its routing table to incorporate this new connectivity information. As can be seen, this creates a burdensome overhead for a network of any significant size.

According to a preferred embodiment of the present invention, each portal node periodically broadcasts a new announcement, to thereby institute a new portal node election process and link-state register updating. In a preferred embodiment, this step is performed once every minute. As is seen, the wireless network according to the present invention is enabled to reestablish all routes between nodes in the network in this time frame.

Packet Forwarding:

According to the present invention, for unicast packet forwarding, once a route is established for a wireless client, the unicast packet forwarding is done by doing the 2-level route lookup at each node. First, the wireless client destination lookup is performed to identify the node this client is attached to. This will give us the node ID of the wireless access point node. Then the backhaul route lookup is performed by using the access point node ID as the destination. This will give us the next-hop address and the outgoing interface (whether the outgoing interface is a selected one of the node's radio interfaces—it typically will have more than one such interfaces—or a wired Ethernet interface) in order to forward the packet. Any failure during the lookup process will cause the packet to be dropped silently.

The challenge for broadcast forwarding in a wireless network is the need to break forwarding (broadcast) loops. The present invention uses a technique called "reverse-path-lookup" to decide if a broadcast looping is occurring, such that the looped packet needs to be dropped. In a wireless network, to relay a broadcast packet, the broadcast packet will be sent out to the same radio interface from which it was received, so all the neighboring nodes, including the upstream node, will receive the packet. From the upstream node's point of view, this packet is looping and should be dropped.

According to the IEEE 802.11 standard, all wireless packets being forwarded in wireless backhaul will contain 4 addresses ("FF" is used to represent the broadcast destination address):

Tx: the transmitting node address.
Rx: the receiving address within one hop.
Src: the original sending node address.
Dst: the ultimate destination address.

"Reverse-path-lookup" will do a unicast route lookup for the "Src" of any broadcast packet. If the nexthop of the route doesn't match the "Tx" value of the packet, the broadcast packet will be dropped.

Figure 4:
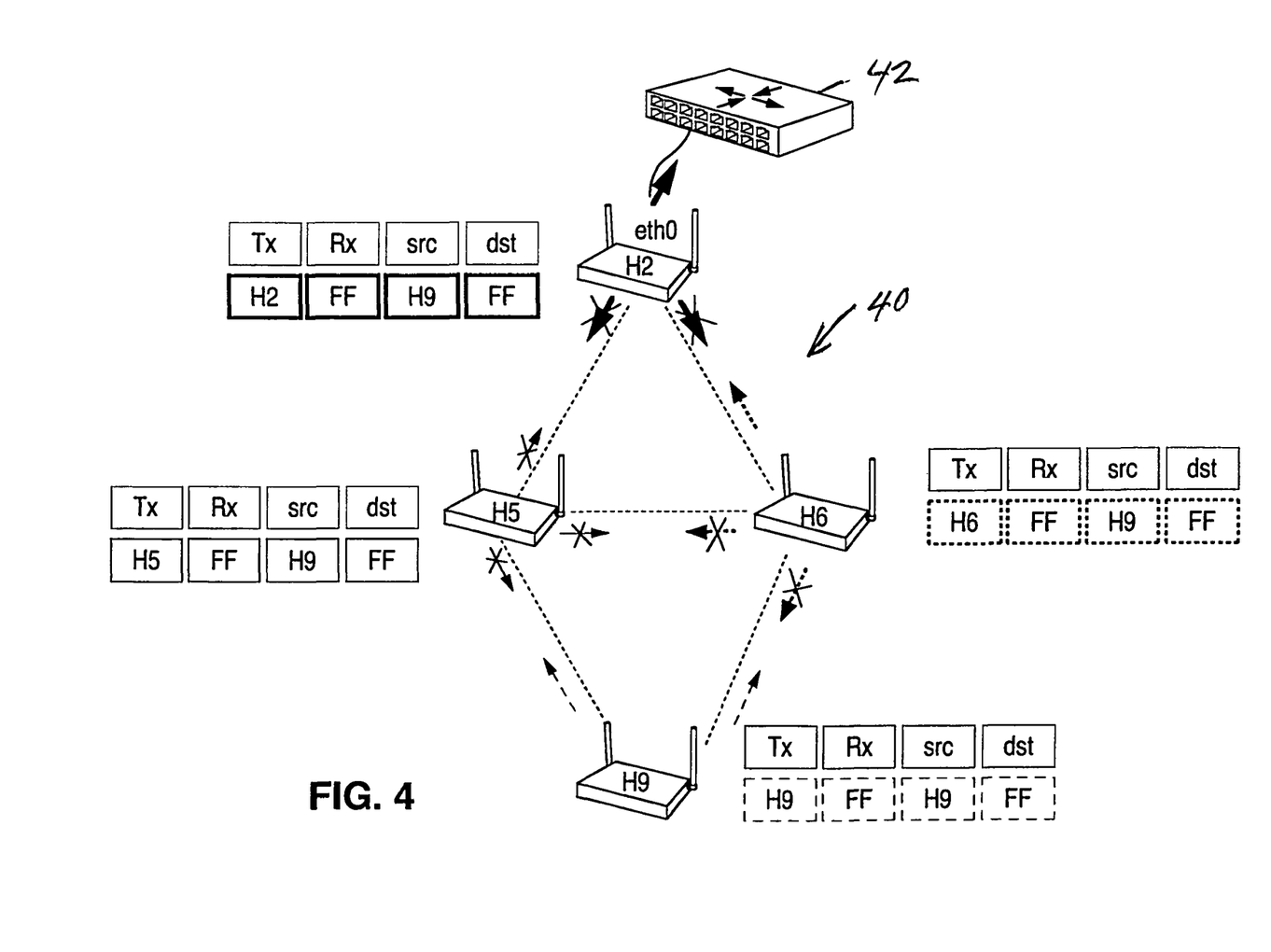
FIG. 4 illustrates an exemplary reverse-path-lookup procedure in a wireless ad-hoc network according to the present invention.

FIG. 4 illustrates an exemplary reverse-path-lookup procedure according to the present invention in a wireless ad-hoc network 40. In this example, the portal node H2 is connected to an external access switch 42 to enable the wireless network 40 to access an external network. As seen in FIG. 4, the process is as follows.

Each node already has identified a unicast route to H9 by performing the nexthop route calculation as stated above. In this example, we list the route to H9 at each node. The "reverse-path-lookup" procedure will use this table later as described in the steps below:

| Node | Nexthop |
|---|---|
| At node H2 | H6 |
| At node H5 | H9 |

-continued

| Node | Nexthop |
|---|---|
| At node H6 | H9 |
| At node H9 | H9 |

Step-1: H9 originates a broadcast packet (as illustrated by the thin dashed arrow pointing from H9). As indicated in FIG. 4, both node H5 and H6 will receive this broadcast packet. Doing a "reverse-path-lookup", both nodes will find that the route to H9 has the nexthop of H9, which matches the Tx value in the packet.

Step-2: H5 relays the broadcast packet (as illustrated by the thin arrows pointing from H5 in FIG. 4), after it sets the Tx field in packet as H5 (itself). H6 relays the broadcast packet (as illustrated by the thick dashed arrows pointing from H6 in FIG. 4), after it sets the Tx field in packet as H6 (itself).

Step-3: All three other nodes receive the packet relayed by H5 (as illustrated in FIG. 4 as the thick arrows pointing from in FIG. 4), but the "reverse-path-lookup" check finds that the Tx value in these packets does not match the nexthop in the route. So all three other nodes will drop the packet relayed by H5.

Step-4: All three other nodes also will receive the packet relayed by H6 (as illustrated as the thick dashed arrows pointing from H6 in FIG. 4). The "reverse-path-lookup" check at H5 and H9 finds that the Tx value in these received packets does not match the nexthop in the route. H5 and H9 will therefore drop the packets they receive. But portal node H2 does a "reverse-path-lookup" check and finds that the Tx value in the packet it received from H6 matches the route nexthop, so H2 will take the packet.

Step-5: H2 relays the packet back out to the wireless interface as well as through the Ethernet interface to access switch 42 (as illustrated in FIG. 4 by the bold arrows pointing from H2). Both H5 and H6 will drop the looped packets they receive from portal node H2 after doing a "reverse-path-lookup" check. The packet sent out through the Ethernet interface to access switch 42 will be handled by the switch 42 and will not be looped back from the switch.

So, by having each node do a "reverse-path-lookup" check and relay a broadcast packet only when the "reverse-path-lookup" conditions are met, the broadcast message successfully reaches everywhere in the wireless network as well as leaking to the wired network, without causing any unwanted packet looping.

Figure 5:
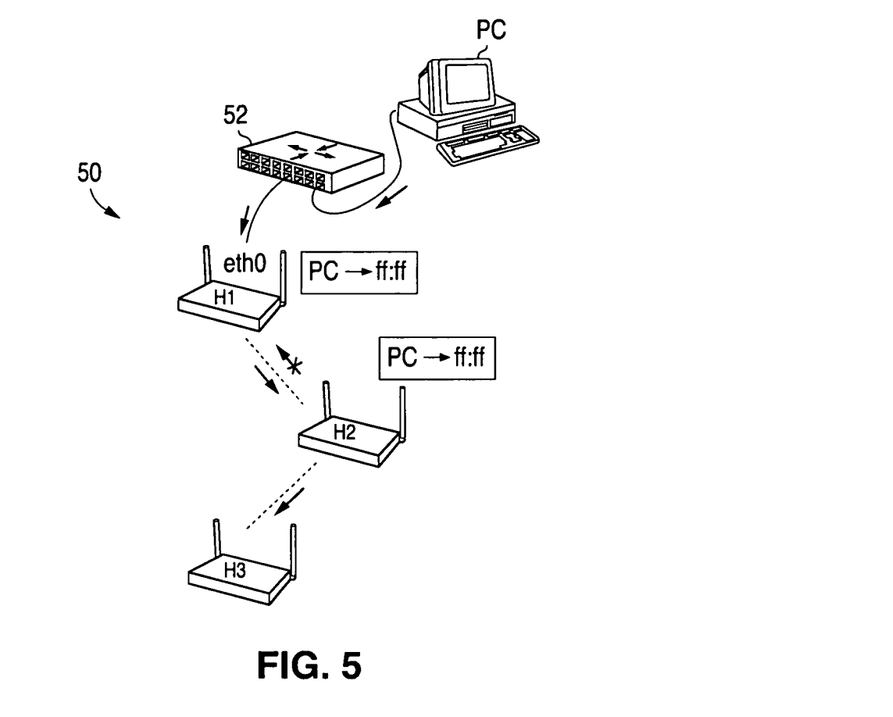
FIG. 5 illustrates an example of the third reverse-path-lookup rule according to the present invention.

FIG. 5 illustrates an example of the third reverse-path-lookup rule according to the present invention. As seen in FIG. 5, the exemplary third rule process is as follows:

Step 1: A PC connected on the internet external to a wireless network 50 sends a broadcast packet (ff:ff is used to denote the destination address at node H3) via an access switch 52. The packet arrives at the 'eth0' interface of node H1.

Step 2: Since it's a broadcast packet, H1 forwards it out on its radio interface. Node H2 is a neighbor of node H1 and will receive the broadcast packet.

Step 3: Using the same logic, H2 will forward the broadcast packet out on its radio interface with destination address 'ff:ff'. H3 is a neighbor of node H2 and will receive the broadcast packet. Notice that H1 will also receive this packet.

Step 4: When H1 receives this looped back packet, it does a reverse-path-lookup, finds that to reach 'PC', the outgoing interface is 'eth0', which is different from the incoming interface 'radio'. The looped broadcast packet is therefore dropped by H1.

To summarize the generic rule of "reverse-path-lookup", any of the following conditions will indicate a possible broadcast loop, and therefore the packet must be dropped:

1) There is no route with destination matching the original sender.
2) There is a route match, the outgoing interface is a wireless backhaul interface, and the next-hop address of the route is different from the relaying node's transmitting interface address.
3) There is a route match, the outgoing interface is NOT a wireless interface, and it is different from the incoming interface.

The above described "reverse-path-lookup" procedure is significantly different from the prior art RPF (Reverse Path Forward) technique, which is used in IP multicast routing protocols like PIM (Protocol Independent Multicast). The major difference is in condition 2 above. In RPF, it does not check the next hop address but rather the incoming interface. If the outgoing interface of RPF lookup is the same as the incoming interface, the packet is then dropped. However, this technique does not work for wireless networks. In wireless networks, when a node forwards a broadcast/multicast packet, it will be forwarded out to the same radio interface from which the packet was received. For example, there are four nodes, Node A, B, C and D, in an exemplary wireless network as shown in FIG. 5. As is seen, Node A relays a multicast packet to Node B, and B communicates with both C and A via a wireless backhaul interface. Node C communicates with both B and D via a wireless backhaul interface.

According to the prior art RPF technique:
(1) Node A relays a multicast packet from one of its clients to B;
(2) B receives the multicast packet, the RPF check is OK, and so B relays the traffic out to C. But notice it's a wireless network, so at the same time A also receives the multicast packet relayed by B;
(3) The same logic happens at C and C will relay the multicast traffic to D. Again, B will receive the packet relayed by C as well because of the wireless media; and
(4) When B receives the packet relayed by C, it cannot be differentiated from the original packet sent by A from the RPF point of view. Therefore, the packet relayed by C will not be dropped by doing the RPF check, and so it will cause an unwanted loop in the wireless network.

The present invention of "reverse-path-lookup" is the solution to this problem.

Figure 6:
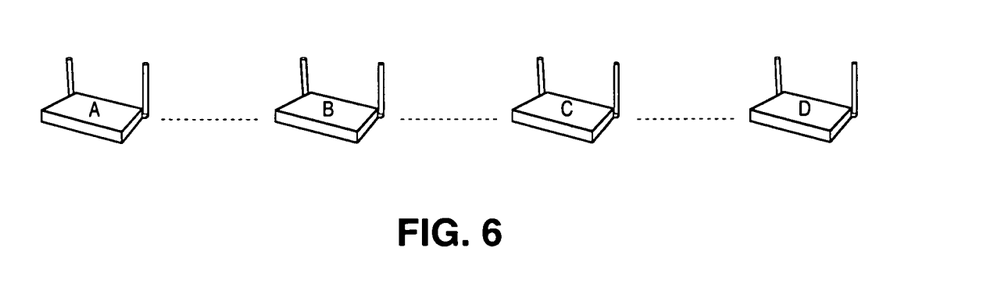
FIG. 6 illustrates a prior art exemplary wireless ad-hoc network having four nodes.
Figure 7:
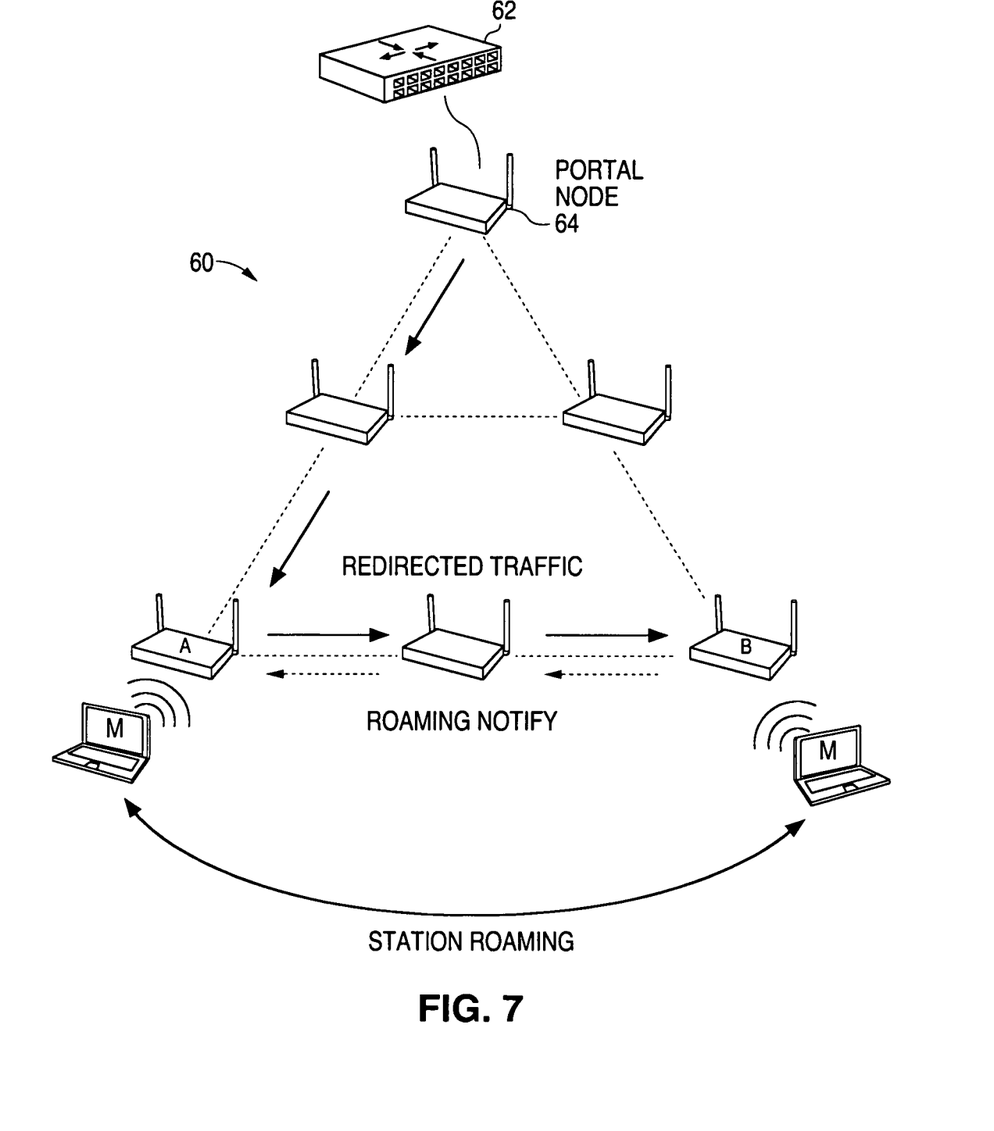
FIG. 7 illustrates an exemplary client roaming procedure in a wireless ad-hoc network according to the present invention.

Wireless Client Roaming:

In a wireless network, client roaming happens virtually all of the time (e.g., people carry their laptop around). The present invention maintains the continuing data flow while the client is roaming. The following example illustrates the method. In this example, as shown in FIG. 6, Station (M) roams from node A to node B. Note that, to perform the roaming notification step for maintaining continuous data traffic, the client link-state information needs to be synchronized across the network. Note also that, before the roaming happens, both node A and node B have the knowledge of the client link-state M→A, as a result of the use of the routing protocol according to the present invention, as described above.

FIG. 6 illustrates an exemplary client roaming procedure according to the present invention in a wireless ad-hoc network 60. As in the previous examples, wireless network 60 is coupled to an external access switch 62 by a portal node 64. As seen in FIG. 6, the process is as follows:

Step-1: Station M roams from node A to B. Node B will update the client link-state of M as M→B. At the same time, node B will find that M was previously connected to A. So, node B will send a unicast message to node A hop-by-hop, informing A about the client link-state change (as illustrated by dashed arrows pointing from node B to node A in FIG. 6). Node A is unable to notify the network that it has lost its link to M since M can no longer communicate with node A once the link with node A has been lost.

Step-2: All the nodes along the way from B to A will get the roaming message, and will update the connection of M→B accordingly.

Step-3: As long as node A receives the roaming message from B and updates the connection M→B, even if other nodes have not updated the client link-state M→B yet, node A is able to forward data packets from portal node 64 to node B (as illustrated by the bold arrows pointing from portal node 64 to node B).

To perform the roaming notification step for maintaining continuous data traffic, we have to have the client link-state information synchronized across the network. This can be done periodically or whenever a client links up to or disconnects from a given wireless node.

All embodiments of the present invention described above are illustrative of the principles of the invention and are not intended to limit the invention to the particular embodiments described. Accordingly, while the preferred embodiment of the invention has been illustrated and described, it will be appreciated that various changes can be made therein without departing from the scope of the invention as claimed.

What is claimed is:

1. A method of routing a packet to a wireless client in a wireless network, the method comprising:
    receiving a first packet at a first network device, wherein the first packet includes a destination network address assigned to the wireless client;
    accessing a client link data structure to identify a first wireless access point node directly connected with the wireless client, wherein the client link data structure includes link-state information specifying a wireless link directly connecting the first wireless access point node to the wireless client;
    accessing a backhaul link data structure to identify at least a portion of a route from the first network device to the first wireless access point node, wherein the backhaul link data structure includes link-state information specifying a logical link between the first network device and the first wireless access point node, and wherein the logical link includes a second network device that is directly connected with the first network device and that is included in the portion of the route;
    dropping the first packet upon detection of a condition associated with a possible broadcast loop, otherwise forwarding the first packet towards the first wireless access point node via the second network device included in the portion of the route, wherein the condition includes detection of a reverse route from the first network device to an original sender of the first packet, the reverse route involving an outgoing network interface of the first network device that is a wireless network interface and the reverse route comprising a next-hop address that is different from a transmitting network interface address of a relaying network device, the first packet being received by the first network device from the transmitting network interface address of the relaying network device.

2. The method of claim 1, wherein the backhaul link data structure includes a next-hop address from the first network device to the second network device included in the portion of the route.

3. The method of claim 1, wherein the backhaul link data structure includes an identifier of an outgoing network interface of the first network device connected with the second network device included in the portion of the route.

4. The method of claim 1, wherein:
    accessing the client link data structure comprises retrieving a wireless node identifier associated with the first wireless access point node from the client link data structure;
    accessing the backhaul link data structure comprises using the wireless node identifier to retrieve the logical link from the backhaul link data structure.

5. The method of claim 1, wherein the client link data structure and the backhaul link data structure are stored in the first network device.

6. The method of claim 1, wherein:
    the first network device generates the client link data structure and the backhaul link data structure in response to at least one unicast link-state message being received from the second network device;
    the second network device includes a portal network device associated with the first network device and the unicast link-state message includes link-state data aggregated from two or more network devices.

7. The method of claim 1, wherein the first packet is sent in response to the wireless client roaming from the first wireless access point node to a second wireless access point node, the method further comprising:
    after accessing the client link data structure to identify the first wireless access point node directly connected with the wireless client, updating the client link data structure to indicate that the wireless client is now directly connected with the second wireless access point node;
    wherein the backhaul link data structure is unchanged in response to the wireless client roaming from the first wireless access point node to the second wireless access point node.

8. The method of claim 1, further comprising determining the reverse route from the first network device to the original sender of the first packet using a reverse-path-lookup.

* * * * *